(12) United States Patent
Rajagopalan et al.

(10) Patent No.: US 7,208,546 B2
(45) Date of Patent: Apr. 24, 2007

(54) NANOCOMPOSITE ETHYLENE COPOLYMER COMPOSITIONS FOR GOLF BALLS

(75) Inventors: Murali Rajagopalan, South Dartmouth, MA (US); Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 11/150,786

(22) Filed: Jun. 10, 2005

(65) Prior Publication Data

US 2005/0228140 A1 Oct. 13, 2005

Related U.S. Application Data

(63) Continuation of application No. 11/138,780, filed on May 26, 2005, which is a continuation-in-part of application No. 11/068,444, filed on Feb. 28, 2005, which is a continuation-in-part of application No. 10/037,987, filed on Jan. 4, 2002, now Pat. No. 6,919,395.

(51) Int. Cl.
*A63B 37/00* (2006.01)
*A63B 37/12* (2006.01)

(52) U.S. Cl. .................. 524/853; 524/789; 524/847; 473/373; 473/374

(58) Field of Classification Search .............. None
See application file for complete search history.

(56) References Cited

U.S. PATENT DOCUMENTS

| | | | |
|---|---|---|---|
| 4,091,083 A | 5/1978 | Hirschvogel | |
| 4,611,810 A | 9/1986 | Kamata | |
| 4,877,501 A | 10/1989 | Schnur et al. | |
| 4,895,713 A | 1/1990 | Greinke et al. | |
| 4,911,981 A | 3/1990 | Schnur et al. | |
| 4,990,291 A | 2/1991 | Schoen et al. | |
| 5,006,297 A | 4/1991 | Brown et al. | |
| 5,028,674 A | 7/1991 | Hatch et al. | |
| 5,334,673 A | 8/1994 | Wu | |
| 5,484,870 A | 1/1996 | Wu | |
| 5,580,927 A | 12/1996 | Chou et al. | |
| 5,692,974 A | 12/1997 | Wu et al. | |
| 5,703,166 A | 12/1997 | Harris et al. | |
| 5,733,428 A | 3/1998 | Calabria et al. | |
| 5,824,746 A | 10/1998 | Harris et al. | |
| 5,885,172 A | 3/1999 | Hebert et al. | |
| 5,908,358 A | 6/1999 | Wu | |
| 5,919,100 A | 7/1999 | Boehm et al. | |
| 5,981,658 A | 11/1999 | Rajagopalan et al. | |
| 6,001,930 A | 12/1999 | Rajagopalan | |
| 6,025,442 A | 2/2000 | Harris et al. | |
| 6,124,389 A | 9/2000 | Cavallaro et al. | |
| 6,142,887 A | 11/2000 | Sullivan et al. | |
| 6,150,462 A | 11/2000 | Rajagopalan et al. | |
| 6,162,135 A | 12/2000 | Bulpett et al. | |
| 6,180,040 B1 | 1/2001 | Ladd et al. | |
| 6,180,722 B1 | 1/2001 | Dalton et al. | |
| 6,187,864 B1 | 2/2001 | Rajagopalan | |
| 6,193,619 B1 | 2/2001 | Wu et al. | |
| 6,204,331 B1 | 3/2001 | Sullivan et al. | |
| 6,207,784 B1 | 3/2001 | Rajagopalan | |
| 6,221,960 B1 | 4/2001 | Rajagopalan | |
| 6,228,903 B1 | 5/2001 | Beall et al. | |
| 6,232,400 B1 | 5/2001 | Harris et al. | |
| 6,245,862 B1 | 6/2001 | Rajagopalan | |
| 6,280,759 B1 | 8/2001 | Price et al. | |
| 6,290,611 B1 | 9/2001 | Rajagopalan et al. | |
| 6,291,592 B1 | 9/2001 | Bissonnette et al. | |
| 6,353,058 B1 | 3/2002 | Rajagopalan | |
| 6,354,966 B1 * | 3/2002 | Takemura et al. | 473/374 |
| 6,384,121 B1 | 5/2002 | Barbee et al. | |
| 6,414,082 B1 | 7/2002 | Rajagopalan et al. | |
| 6,444,742 B1 | 9/2002 | Rong et al. | |
| 6,454,666 B1 | 9/2002 | Shira | |
| 6,458,895 B1 | 10/2002 | Wrigley et al. | |
| 6,462,122 B1 | 10/2002 | Qian et al. | |
| 6,465,578 B1 | 10/2002 | Bissonnette et al. | |
| 6,476,130 B1 | 11/2002 | Rajagopalan et al. | |
| 6,485,378 B1 | 11/2002 | Boehm | |
| 6,486,253 B1 | 11/2002 | Gilmer et al. | |
| 6,486,254 B1 | 11/2002 | Barbee et al. | |
| 6,494,795 B2 | 12/2002 | Sullivan | |

(Continued)

FOREIGN PATENT DOCUMENTS

| | | |
|---|---|---|
| JP | 11-244419 | 9/1999 |
| WO | WO 00/23519 | 4/2000 |
| WO | WO 01/29129 | 4/2001 |
| WO | WO 01/43832 | 6/2001 |
| WO | WO 0202193 | 1/2002 |
| WO | WO 0209823 | 2/2002 |

OTHER PUBLICATIONS

Morrison, Organic Chemistry 3rd Edition, p. 1033.*

(Continued)

*Primary Examiner*—David J. Buttner
(74) *Attorney, Agent, or Firm*—William B. Lacy

(57) ABSTRACT

A method for making a golf ball including the steps of providing a core; providing a nanoparticulate; providing a first monomer including an olefin; providing a second monomer including an $\alpha,\beta$-ethylenically unsaturated carboxylic acid; in-situ polymerizing the first monomer and the second monomer in the presence of the nanoparticulate to form a nanocomposite non-ionic polymer; and forming a cover layer about the core from the nanocomposite non-ionic polymer.

11 Claims, No Drawings

U.S. PATENT DOCUMENTS

| | | | |
|---|---|---|---|
| 6,552,113 | B2 | 4/2003 | Bagrodia et al. |
| 6,632,868 | B2 | 10/2003 | Qian et al. |
| 6,653,382 | B1 | 11/2003 | Statz et al. |
| 6,653,388 | B1 | 11/2003 | Barbee et al. |
| 6,710,114 | B2 | 3/2004 | Bissonnette et al. |
| 6,793,592 | B2 | 9/2004 | Sullivan et al. |
| 6,794,447 | B1 | 9/2004 | Kim et al. |
| 6,808,461 | B2 | 10/2004 | Harris et al. |
| 6,919,395 | B2 | 7/2005 | Rajagopalan et al. |
| 2001/0024982 | A1 | 9/2001 | Cavallaro et al. |
| 2001/0056197 | A1 | 12/2001 | Albert et al. |
| 2003/0050373 | A1 | 3/2003 | Chen |
| 2003/0100656 | A1 | 5/2003 | Majumdar et al. |
| 2003/0114565 | A1 | 6/2003 | Chen et al. |
| 2003/0125480 | A1* | 7/2003 | Sullivan et al. ............ 525/418 |
| 2004/0018895 | A1 | 1/2004 | Bulpett et al. |
| 2004/0092336 | A1 | 5/2004 | Kim et al. |
| 2005/0003180 | A1 | 1/2005 | Kondos |
| 2005/0059756 | A1 | 3/2005 | Kim et al. |

OTHER PUBLICATIONS

Dagani, R. "Building From the Bottom Up," Chemical & Engineering News, Oct. 16, 2000, p. 27.

Sherman, L. M. "Nanocomposites a Little Goes a Long Way," Plastics Technology, Jun. 1999, p. 52.

Dagani, R. "Putting the 'Nano' into Composites," Science/Technology, Jun. 7, 1999, vol. 77, No. 23, pp. 25-37.

Petrovic, Z. S.; Javni, I.; Waddon, A. "Polyurethane Elastomers with Nano-Fillers", Conference Proceedings at ANTEC 1998, Atlanta, Georgia, Apr. 26, 1998, p. 225.

Kressler, J.; Thomann, R. "Nanocomposites Based on a Synthetic Layer Silicate and Polyamide-12," Conference Proceedings at ANTEC 1998, Atlanta, Georgia, Apr. 26, 1998, p. 447.

Haddad, T. S.; Schwab, J.; Mather, P. T.; Romo-Uribe, A.; Otonari, Y.; Carr, M. J.; Lichtenhan, J. D. "The Rational Design of Silsesquioxane-Based Polymers", Conference Proceedings at ANTEC 1997, Toronto, Canada, Apr. 27, 1997, vol. II-Materials, p. 1814.

Novak, B. M.; Ellsworth, M.W.; Verrier, C. "Organic-Inorganic Nanocomposite Materials. Mechanical and Thermal Properties," Polymeric Materials Science and Engineering, American Chemical Society Spring Meeting, 1994, San Diego, California, vol. 70, p. 266.

* cited by examiner

NANOCOMPOSITE ETHYLENE COPOLYMER COMPOSITIONS FOR GOLF BALLS

CROSS-REFERENCE TO RELATED APPLICATIONS

This application is a continuation of U.S. patent application Ser. No. 11/138,780, filed May 26, 2005, which is a continuation-in-part of U.S. patent application Ser. No. 11/068,444, filed Feb. 28, 2005, which is a continuation-in-part of U.S. application Ser. No. 10/037,987, filed Jan. 4, 2002 and now U.S. Pat. No. 6,919.395, the disclosures of which are incorporated herein, in their entirety, by reference.

FIELD OF THE INVENTION

This invention relates generally to compositions for golf ball cores, intermediate layers, and covers and, in particular, nanocomposite ethylene copolymer compositions prepared by in-situ polymerization or melt blending.

BACKGROUND

Golf balls have a variety of constructions. Solid golf balls include one-piece, two-piece (i.e., solid core and a cover), and multi-layer (i.e., solid core of a center and one or more layers and a cover of one or more layers) golf balls. Wound golf balls typically include a solid, hollow, or fluid-filled center, surrounded by a tensioned elastomeric material, and a cover. While solid golf balls now dominate the marketplace because of their distance, lower cost, and durability, manufacturers are constantly trying to improve the "feel" of solid balls in an attempt to make it more like that associated with a wound construction.

By the materials used for golf ball construction, manufacturers can vary a wide range of playing characteristics, such as compression, velocity, "feel," and spin, each of which can be optimized for various playing abilities. In particular, a variety of core and cover layer(s) constructions and compositions have been investigated, such as polymeric compositions and blends, including polybutadiene rubbers, polyurethanes, and ionomers. These 'conventional' materials, however, have inherent limitations in their properties.

It is now believed that blending nano-materials with conventional materials can improve the properties of the virgin material. It is also believed that forming golf ball layers with conventional materials in 'nano' sizes can provide improved properties compared to that of the same 'larger' material. The properties that can be improved include, but are not limited to, density, dimensional stability, stiffness, abrasion resistance, moisture transmission, and resiliency. Nanomaterials are unique because of their size and shape, and because they can be selectively modified by chemical or other sources at an atomic or molecular level. These nanomaterials, therefore, provide novel and sometimes unusual material properties (even at lower loading levels), such as increased modulus (in some cases even lower hardness), elongation at break, optical property, barrier to moisture, abrasion resistance, low hysteresis, and surface appearance, especially compared to identical materials of conventional (larger) size. These unique properties may be utilized for golf ball construction in manners previously not available.

SUMMARY OF THE INVENTION

The present invention is directed to a method for making a golf ball including the steps of providing a nanoparticulate; providing a first monomer including an olefin; providing a second monomer comprising an $\alpha,\beta$-ethylenically-unsaturated carboxylic acid; in-situ polymerizing the first monomer and the second monomer in the presence of the nanoparticulate to form a first polymer; providing a cation source; post neutralizing the polymer composition with the cation source to form a nanocomposite ionomer; forming a cover layer from the nanocomposite ionomer.

Preferably, the first monomer includes ethylene or propylene and the second monomer comprises acrylic acid or methacrylic acid. In one embodiment, the nanoparticulate is pre-dispersed in the second monomer. The method may, optionally, include the step of providing a third monomer comprising ethylenically-unsaturated alkyl acrylate or ethylenically-unsaturated alkyl methacrylate prior to the in-situ polymerization.

Typically, the cation source includes a first metal salt of an organic acid, inorganic base, or an organic base; and is present in an amount sufficient to neutralize the $\alpha,\beta$-ethylenically-unsaturated carboxylic acid by 10% to 90%. In one embodiment, a second organic acid or a metal salt thereof is also included in the blend. Preferably, the cation source is present in an amount sufficient to neutralize the $\alpha,\beta$-ethylenically-unsaturated carboxylic acid by 90% to 100%. The polymer may further include a fatty acid or a metal salt thereof.

The fatty acid salt is generally formed from a fatty acid including stearic acid, lauric acid, behenic acid, erucic acid, oleic acid, linoleic acid, pelargonic acid, and dimerized derivatives thereof. Also, the fatty acid salt is typically formed from a metal cation including barium, lithium, sodium, zinc, bismuth, chromium, cobalt, copper, potassium, strontium, titanium, tungsten, magnesium, cesium, iron, nickel, silver, aluminum, tin, and calcium. The cation source may be metal cations of lithium, sodium, potassium, magnesium, calcium, barium, lead, tin, zinc, or aluminum.

The golf ball may include a core, and the layer is disposed about the core. The nanoparticulate may be swellable layered materials; micaceous minerals; smectite minerals; carbon nanotubes; fullerenes; nanoscale titanium oxides; iron oxides; ceramics; modified ceramics; metal and oxide powders; titanium dioxide particles; single-wall and multi-wall carbon nanotubes; polymer nanofibers; carbon nanofibrils; nitrides; carbides; sulfides; gold nanoparticles; ormocers; glass ionomers; resin-modified glass ionomers; silicon ionomers; polymerizable cements; metal-oxide polymer composites; lipid-based nanotubules, graphite sheets, or polyhedral oligomeric silsequioxanes.

The present invention is also directed to a method for making a golf ball comprising the steps of providing a nanoparticulate; providing a first monomer comprising an olefin; providing an ionic co-monomer; in-situ polymerizing the first monomer and the ionic co-monomer in the presence of the nanoparticulate to form a polymer; providing a cation source; post neutralizing the polymer with the cation source to form a nanocomposite ionomer; and forming a golf ball layer from the nanocomposite ionomer.

The present invention is further directed to a golf ball comprising a core; and a cover disposed about the core, the cover comprising a nanocomposite ethylene copolymer comprising a polymer formed from the in-situ polymerization of a first monomer comprising an olefin and a second monomer comprising an $\alpha,\beta$-ethylenically-unsaturated carboxylic acid, in the presence of a nanoparticulate; and a cation source in an amount sufficient to neutralize the α,β-ethylenically-unsaturated carboxylic acid by 10% to 100%.

Preferably, the nanocomposite ethylene copolymer includes a fatty acid or a metal salt thereof. In one embodiment, the cover is an intermediate layer and the golf ball further includes an outer cover layer disposed about the intermediate layer. In another embodiment, the cover includes polyurethanes, polyureas, polyurea-urethanes, polyurethane-ureas, ionomeric materials, vinyl resins, polyolefins, polyamides, acrylic resins, thermoplastics, polyphenylene oxide resins, thermoplastic polyesters, thermoplastic rubbers, or fully-neutralized ionomers.

DETAILED DESCRIPTION

The golf balls of the present invention include a core and a cover surrounding the core, at least one of which is formed from a composition comprising a nanoparticulate material or a blend of a nanoparticulate material with polymeric and/or rubber materials. The core and/or the cover may have more than one layer and an intermediate layer may be disposed between the core and the cover of the golf ball. The golf ball cores of the present invention may comprise any of a variety of constructions. For example, the core of the golf ball may comprise a solid sphere or may be a solid center surrounded by at least one intermediate or outer core layer. The center of the core may also be a liquid filled sphere surrounded by at least one core layer. The intermediate layer or outer core layer may also comprise a plurality of layers. The core may also comprise a solid or liquid filled center around which tensioned elastomeric material is wound. The cover layer may be a single layer or, for example, formed of a plurality of layers, such as an inner cover layer and an outer cover layer. A non-structural layer, such as a water vapor barrier layer, may also be included between any two layers or even as a coating layer.

While the various golf ball centers, cores, and layers may be formed of any materials known to those skilled in the art, the present invention is particularly directed to compositions comprising nanoparticulates, the compositions being suitable for any of the above golf ball components.

Nanoparticulates are generally divided into three categories: organic, inorganic, and metallic, all of which are suitable for use in compositions for golf ball components. Because of their sub-micron size (particle size of 1000 nm or less), a higher concentration of particles (greater surface area) are available to interact with the surrounding polymer or rubber materials, dramatically increasing their effect on the properties of the compositions at concentrations much lower than conventionally required. This, for example, might allow the golf ball construction to take on a form not previously available (i.e., increasing weight of another layer as a result of the lower amount of nanoparticulate (and therefore decreased weight) used.

Because the nanometer-sized particles have such a large surface area, as well as tailored chemical surface treatment or modification, small quantities of nanomaterials can have an intimate interactions and compatibility with the host matrix, typically a polymeric material, not available to conventional-sized particles. As used herein, the term "matrix polymer" refers to a thermoplastic or thermosetting polymer in which a nanomaterial or nanoparticulate is dispersed to form a nanocomposite. These interactions can cause significant property changes in the compositions. For example, a 3% to 5% loading of nanoclay into a polymer blend will exhibit properties similar to 20% to 60% loading of conventional reinforcing agents such as kaolin, silica, talc, and carbon black. The resulting compositions are generally referred as "nanocomposites." Preferably, the nanoparticles of the present invention have a surface area of at least about 100 $m^2/g$, more preferably at least about 250 $m^2/g$, and most preferably at least about 500 $m^2/g$.

The nanomaterials typically have particle sizes ranging from about 0.9 nm up to 100 nm in diameter and have an aspect ratio of about 100 to about 1000. Any swellable layered material that sufficiently sorb the intercalant polymer to increase the interlayer spacing between adjacent platelets to at least about 10 Å (when the phyllosilicate is measured dry) may be used. Useful swellable layered materials include, but are not limited to, phyllosilicates, such as smectite clay minerals, e.g., montmorillonite, particularly sodium montmorillonite; magnesium montmorillonite; and/or calcium montmorillonite; nontronite; beidellite; volkonskoite; hectorite; saponite; sauconite; sobockite; stevensite; svinfordite; vermiculite; and the like.

Other useful layered materials include micaceous minerals, such as illite and mixed layered illite, and smectite minerals, such as ledikite, and admixtures of illites with the clay minerals named above. Other layered materials having little or no charge on the layers may be useful in this invention provided they can be intercalated with the intercalant polymers to expand their interlayer spacing to at least about 10 Å. Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

The interlayer spacing is measured when the layered material is "dry," containing 3% to 6% by weight water, based on the dry weight of the layered material. The preferred clay materials generally include interlayer cations, such as $Na^+$, $Ca^{+2}$, $K^+$, $Mg^{+2}$, $NH_4^+$, and the like, including mixtures thereof.

Preferably, the compositions of the present invention comprise inorganic nanomaterials, such as chemically-modified montmorillonite clays and polymer grade montmorillonites, commercially available from Nanocor Company of Arlington Heights, Ill., and CLOISITE®, commercially available from Southern Clay Products of Widner, United Kingdom.

The compositions of the present invention may also comprise organic nanomaterials like polyhedral oligomeric silsequioxanes, essentially chemically modified nano-scale particles of silica. Examples of these materials include POSS®, commercially available from Hybrid Plastics of Fountain Valley, Calif.

The compositions of the present invention may also include other nanomaterials including, but not limited to, carbon nanotubes; fullerenes; nanoscale titanium oxides; iron oxides; ceramics; modified ceramics, such as organic/inorganic hybrid polymers; metal and oxide powders (ultrafine and superfine); titanium dioxide particles; single-wall and multi-wall carbon nanotubes; polymer nanofibers; carbon nanofibrils; nitrides; carbides; sulfides; gold nanoparticles; and mixtures thereof.

"Hybrid" nanomaterials are also suitable for the compositions of the present invention and include, but are not limited to, glass ionomers, ormocers, and other inorganic-organic materials. The "hybrid" materials of the present invention may be described by a number of lexicons including, but not limited to, glass ionomers, resin-modified glass ionomers, silicon ionomers, dental cements or restorative compositions, polymerizable cements, metal-oxide polymer composites, and ionomer cements.

Ormocers are composite materials formed of ceramic and polymer networks that combine and interpenetrate with one another. The ormocers of the present invention typically have particle diameters in the range of from about 10 nm to about 300 nm. Preferably, the particle diameters are from about 20 nm to about 200 nm. The ormocers generally have a surface area of about 4 m$^2$/g to about 600 m$^2$/g, more preferably about 10 m$^2$/g to about 50 m$^2$/g.

Ormocers are also composite materials which have a network of organic and inorganic polymers intertwined in one another. The expression "network" designates a three-dimensional arrangement of substances covalently bound to one another. The organic network fills empty sites of the inorganic network, so that the two networks are firmly bound to one another. In this connection, inorganic means that the main chains are formed, in particular, of —Si—O— bonds, which can be both linear as well as branched. The Si atoms of the inorganic network can be replaced, partially, by other metal or semimetal atoms including, but not limited to, Al, B, Zr, Y, Ba, and Ti. The organic network is obtained by the polymerization of organic monomers, in particular, vinyl ether radicals, wherein other monomers, which can be copolymerized with vinyl ether radicals can be included. The organic network of ormocers, in accordance with the invention, can be obtained by the hydrolytic condensation of one or more silicon compounds, wherein preferred silicon compounds are monomeric silanes.

Suitable ormocer production methods are disclosed in U.S. Patent Application No. 2001/0056197, filed Dec. 27, 2001, the disclosure of which is incorporated herein, in its entirely, by express reference thereto.

In accordance to an aspect of the invention, a moisture vapor barrier layer, which can be formed from any material disclosed herein, may also have nanoparticulates, including ormocers, disposed therein. Vapor barrier layers prevent or minimize the penetration of moisture, typically water vapor, into the core of the golf ball. The nanoparticles are preferably hydrophobic and create a more tortuous path for the water molecules across the water vapor barrier layer to reduce the water vapor transmission rate ("WVTR") of the layer. The barrier layers may also include nanoscale ceramic particles, flaked glass, and flaked metals (e.g., micaceous materials, iron oxide or aluminum). In one embodiment, ormocers are employed as a water vapor barrier layer disposed between the core and cover layers. Preferably, the water vapor barrier layer preferably has a water vapor transmission rate that is lower than that of the cover, and more preferably less than the water vapor transmission rate of an ionomer resin such as SURLYN®, which is in the range of about 0.45 to about 0.95 (g·mm)/(m$^2$·day). The water vapor transmission rate is generally measured using the ASTM F1249-90, 1653-99, or F372-99 standards.

Any of the disclosed nanoparticulates are effective as water vapor barrier layers, and have the particular advantage of improving (decreasing) the WVTR of layer materials in their virgin state. Preferably, the WVTR is improved by 10%, more preferably by 25%, most preferably by 50%. Optionally, ormocers (and/or other nanoparticulates) may be used in barrier layer(s) and/or coating layer(s), situated over the core, intermediate layers, or cover layers, most preferably over the cover layer.

Suitable glass ionomer cements are generally comprised of a powder component containing aluminosilicate and a liquid portion. Often the liquid portion is expressed as containing polyacrylic acid, polymaleic acid, polyitaconic acid, or a copolymer of at least two of the acids. The liquid portion may also comprise carboxylate polymers or carboxylic acid polymeric structures, such as those including acrylic acid, maleic acid, crotonic acid, isocrotonic acid, methacrylic acid, sorbic acid, cinnamic acid, fumaric acids, and the like. In most glass ionomer cements, the primary reactions which cause the glass ionomer cement to harden is cross-linking, i.e., the cross-linking of polycarboxylate chains by metal ions from the glass. Also, during setting, the acids of the glass ionomer cement dissolve the glass structure to release metal constituents of the glass. Metal carboxylates are formed during the setting process. This may be distinguished from the primary setting reactions of acrylic cements which are other forms of polymerization reactions. Though other forms of polymerization reactions may occur in glass ionomer cements, these reactions are secondary to the cross-linking reactions of the glass ionomer cement.

Polyalkenoate cements, such as glass-ionomers and zinc polycarboxylate, are also suitable. "Hybrid" compositions according to the present invention comprise a reaction product between an aluminosilicate glass powder containing at least one element selected from Ca, Sr, and Ra and an organic acid containing one or more carboxyl groups in one molecule thereof; a methanol-insoluble polymer; a monomer containing at least one unsaturated double bond and having no acidic group; a polymerization initiator; and, optionally, a filler.

"Hybrid" composite materials may be characterized by a substrate and by a nano-composite which is in functional contact with the substrate and is obtainable by surface modification of colloidal inorganic particles with one or more silanes of the general formula (I) $R_x$—Si—$A_{4-x}$ where the radicals A are identical or different and are hydroxyl groups or groups which can be removed hydrolytically, except methoxy, the radicals R are identical or different and are groups which cannot be removed hydrolytically and x is 0, 1, 2 or 3, where x≧1 in at least 50 mol % of the silanes; under the conditions of the sol-gel process with a below-stoichiometric amount of water, based on the hydrolysable groups which are present, with formation of a nano-composite sol, and further hydrolysis and condensation of the nano-composite sol, if desired, before it is brought into contact with the substrate, followed by curing, said substrate not being a glass or mineral fiber or a vegetable material.

Ormocers, which can be obtained by the hydrolytic condensation of one or more silicon compounds, and the subsequent polymerization of organic monomers, wherein at least one silicon compound comprises vinyl ether radicals of formula:

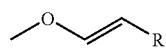

wherein R represents hydrogen, methyl, or ethyl, are also suitable. Low-viscosity "hybrid" materials containing a non-settling nano-scale filler are also suitable. The filler forms a stable sol with low-viscosity materials and the filler may be prepared by surface treatment of fillers having a primary particle size of from about 1 to about 100 nm.

Interwoven organic-inorganic solid composite materials are also suitable. These materials are formed of a mixture of a precursor polymer, an alcohol, and a catalyst system. The precursor polymer typically has an inorganic polymer backbone of Si or Ti with linkages to polymerizable alkoxide groups. The catalyst system promotes the hydrolysis and polymerization of the alkoxide groups and the condensation of the inorganic backbone to form a solid interwoven network with the organic polymer chains interpenetrating the network.

These "hybrid" materials and the nanoparticulates described herein are comtemplated for use in compositions for a variety of golf ball components including, but are not limited to, golf ball centers, cores, layers, covers, coatings, and, additionally, continuous or non-continuous layers such as those described in U.S. Pat. No. 6,494,795, which is incorporated herein, in its entirety, by express reference thereto.

Lipid-based nanotubules are also suitable nanomaterials for the compositions of the present invention. Lipid tubules are a self-organizing system in which surfactants crystallize into tightly packed bilayers that spontaneously form cylinders less than 100 nm in diameter. These novel cylindrical lipid structures, called nanotubules, can be used to entrap and release a variety of active compounds into surrounding materials. One embodiment of the invention is directed to the controlled release of desirable active agents or compounds, microencapsulated in nanotubules, by their dispersion in golf ball coatings, paints, adhesives, and component compositions. The tubules can be dispersed wet, aqueous or solvent-based, or dry, if robustness is required. Filled or unfilled nanotubules may also be used to adjust virgin material properties.

In another embodiment, graphite nanosheets are used to form one or more inner cover layers, but the golf ball of the present invention may be formed with a variety of constructions. Graphite typically consists of a plurality of layered planes of hexagonal arrays or networks of carbon atoms. The layered planes of hexagonally arranged carbon atoms are substantially flat and are oriented substantially parallel to one another. The carbon atoms on a single layered plane are covalently bonded together, and the layered planes are bonded by substantially weaker van der Waals forces. Graphite is also an anisotropic structure, exhibits many properties that are highly directional, and possesses a high degree of orientation. Graphite includes natural graphite, Kish graphite and synthetic graphite. Graphite fillers are available commercially in powder form from Asbury Graphite, Inc. of Asbury, N.J. and Poco Graphite, Inc. of Decatur, Tex.

In accordance with a first preferred embodiment of the present invention and as described in detail below, graphite is intercalated to insert atoms or molecules in the inter-planar spaces between the layered planes. The intercalated graphite is then expanded or exfoliated by sudden exposure to high heat to expand the inter-planar spacing between the layered planes. The exfoliated graphite is then mixed with suitable monomers and other additives prior to in situ polymerization to form nanosheets of graphite dispersed in a polymeric matrix. The polymeric matrix with graphite nanosheets dispersed therein may be formed into one or more layers of a golf ball, or it may be blended with other polymers described herein to form one or more layers of a golf ball.

A preferred method to intercalate graphite is immersing the graphite in a solution containing an oxidizing agent. Suitable oxidizing agents include solutions containing nitric acid, potassium chlorate, chromic acid, potassium permanganate, potassium chromate, potassium dichromate, perchloric acid and the like, or mixtures, such as concentrated nitric acid and chlorate, chromic acid and phosphoric acid, sulfuric acid and nitric acid, or mixtures of a strong organic acid, e.g., trifluoroacetic acid, and a strong oxidizing agent soluble in the organic acid.

Preferably, the intercalating agent is a solution containing a mixture of X/Y, wherein X can be sulfuric acid or sulfuric acid and phosphoric acid and Y is an oxidizing agent, such as nitric acid, perchloric acid, chromic acid, potassium permanganate, sodium nitrate, hydrogen peroxide, iodic or periodic acids. More preferably, the intercalating agent is a solution comprising about 80% by volume of sulfuric acid and 20% by volume of nitric acid. Preferably, the graphite is immersed in the sulfuric and nitric acid solution for up to 24 hours, or more. The resulting material, also known as graphite intercalated compound, comprises layered planes of carbon and intercalate layers stacked on top of one another in a periodic fashion. Typically, 1–5 layers of carbon can be present between adjacent intercalate layers. The preferred quantity of intercalated solution is from about 10 parts to about 150 parts of solution to 100 parts of graphite, more preferably from about 50 parts to about 120 parts to 100 parts of graphite.

Alternatively, the intercalating process can be achieved by other chemical treatments. For example, the intercalating agents may include a halogen, such as bromine, or a metal halide such as ferric chloride, aluminum chloride, or the like. A halogen, particularly bromine, may be intercalated by contacting graphite with bromine vapors, or with a solution of bromine in sulfuric acid, or with bromine dissolved in a suitable organic solvent. Metal halides can be intercalated by contacting the graphite with a suitable metal halide solution. For example, ferric chloride can be intercalated by contacting graphite with an aqueous solution of ferric chloride, or with a mixture of ferric chloride and sulfuric acid.

Other suitable intercalating agents include, but are not limited to, chromyl chloride, sulfur trioxide, antimony trichloride, chromium(III)chloride, iodine chloride, chromium(IV)oxide, gold(III)chloride, indium chloride, platinum(IV)chloride, chromyl fluoride, tantalum(V)chloride, samarium chloride, zirconium(IV)chloride, uranium chloride, and yttrium chloride.

The intercalated graphite is then washed with water until excess intercalating agent is washed from the graphite, or if acid is used until the washed water pH value is neutral. The graphite is then preferably heated to above the boiling point of the washed solution to evaporate the washed solution. Alternatively, to eliminate the post-intercalation washing step the amount of intercalated solution may be reduced to about 10 parts to about 50 parts per 100 parts of graphite as disclosed in U.S. Pat. No. 4,895,713, incorporated herein by reference.

To expand or exfoliate the inter-planar spacing between the layered planes, the intercalated graphite is exposed to very high heat in a relatively short amount of time. Without being bound by any particular theory, the exfoliated mechanism is the decomposition of the trapped intercalating agent, such as sulfuric and nitric acids ($H_2SO_4+HNO_3$), between the highly oriented layered planes when exposed to heat.

Suitable exfoliated processes include heating the intercalated graphite for a few seconds at temperatures of at least greater than 500° C., more preferably greater than 700° C., and more typically 1000° C. or more. The treated graphite typically expands in the "c" direction about 100 to more than 300 times the pre-treatment thickness. In one preferred exfoliating process, the intercalated graphite is exposed to temperature of about 1050° C. for about 15 seconds to achieve a thickness in the "c" direction of about 300 times of that in the pre-exfoliated graphite.

The exfoliated graphite is then mixed with a monomer and heated to the polymerization or vulcanization temperature to form a polymer with nanosheets of exfoliated graphite dispersed therein. The exfoliated graphite also reacts with the monomer to become a part of the structure of the polymer. It has also been shown that the nanosheets retained its structure in the polymer matrix, and that the monomer or polymer entered the gallery spacing between the nanosheets. It has also been determined that the dispersion of nanosheets of exfoliated graphite in the polymeric matrix improves the tensile strength of the polymer. This improved tensile strength of the polymer/graphite composite improves its impact strength.

The polymeric matrix can be any polymeric composition that is compatible with carbon. Suitable polymeric compositions include thermosetting polymers and thermoplastic polymers. More particularly, suitable polymeric compositions include polyethylene, polypropylene, acrylic and methacrylic polymers such as polymethyl methacrylate, polystyrene, polyepoxides or any polymer comprising an epoxy moiety, phenol-formaldehydes, polyamides, polyesters, polyvinyl chlorides, polycarbonates, polyacetals, polytetrafluoroethylene, polyvinylidene fluoride, polyurethanes, copolymers and blends of same and the like.

Suitable polymeric compositions also include, but not limited to, one or more of partially-or fully-neutralized ionomers including those neutralized by a metal ion source wherein the metal ion is the salt of an organic acid, polyolefins including polyethylene, polypropylene, polybutylene and copolymers thereof including polyethylene acrylic acid or methacrylic acid copolymers, or a terpolymer of ethylene, a softening acrylate class ester such as methyl acrylate, n-butyl-acrylate or iso-butyl-acrylate, and a carboxylic acid such as acrylic acid or methacrylic acid (e.g., terpolymers including polyethylene-methacrylic acid-n or iso-butyl acrylate and polyethylene-acrylic acid-methyl acrylate, polyethylene ethyl or methyl acrylate, polyethylene vinyl acetate, polyethylene glycidyl alkyl acrylates). Suitable polymers also include metallocene catalyzed polyolefins, polyesters, polyamides, non-ionomeric thermoplastic elastomers, copolyether-esters, copolyether-amides, thermoplastic or thermosetting polyurethanes, polyureas, polyurethane ionomers, epoxies, polycarbonates, polybutadiene, polyisoprene, and blends thereof. Suitable polymeric materials also include those listed in U.S. Pat. Nos. 5,919,100, 6,187,864, 6,232,400, 6,245,862, 6,290,611, 6,353,058, 6,204,331 and 6,142,887 and in PCT Publication Nos. WO 00/23519 and WO 01/29129, all incorporated herein. Ionomers, ionomer blends, thermosetting or thermoplastic polyurethanes, metallocenes are also suitable materials.

Most preferably, the polymer matrix materials include natural rubber, stryene-butadiene rubber, stryene-propylene or ethylene-diene block copolymer rubber, polyisoprene, polybutadiene, copolymers comprising ethylene or propylene such as ethylene-propylene rubber (EPR) or ethylene-propylene diene monomer (EPDM) elastomer, copolymers of acrylonitrile and a diene comprising elastomer (such as butadiene), polychloroprene and any copolymer including chloroprene, butyl rubber, halogenated butyl rubber, polysulfide rubber, silicone comprising polymers Exfoliated graphite may also be bonded with organic char materials, such as coal tar pitches, asphalts, phenol-formaldehyde, urea-formaldehyde, polyvinylidene chloride, polyacrylonitrile, sugars, and saccharides, inorganic glass bonding agents, such as boric oxide, silica, phosphorous, pentoxide, germanium oxide, vanadium pentoxide, and inorganic salts, such as beryllium fluoride, sulfates, chlorides and carbonates.

Alternatively, hydrogen peroxide can be blended with the intercalating agent, preferably sulfuric acid, and agitated until graphite-hydrogensulfate compound is formed. The compound is then removed from the intercalating solution and washed. The graphite-hydrogensulfate compound is exfoliated as described above to form the exfoliated compound. This compound has properties that are similar to the exfoliated graphite. Advantageously, the process of producing graphite-hydrogensulfate compound releases less pollutants into the environment. This method is described in U.S. Pat. No. 4,091,083, incorporated herein by reference.

Additionally, the nanosheets/polymeric matrix composite may be grounded or crushed and then mixed or blended with a second encasing polymeric material to produce a layer on the golf ball. Suitable polymeric materials for the polymeric matrix discussed above are also suitable to be second encasing material. Preferably, the polymeric matrix material is methyl methacrylate and the second encasing polymeric material is a polyurethane or a natural or synthetic rubber, preferably polybutadiene.

The nanomaterials can be blended with thermoplastics, thermoplastic elastomers, rubbers, and thermoset materials useful in making golf ball components. The nanoparticulates can be incorporated either during blending operation such as in single or twin-screw extruders or in rubber mixing equipment like brabender or internal mixers. Also, the nanoparticulates can be blended in a reactor during the polymerization of thermoplastic or thermoset or rubbery materials.

The nanoparticulates of the present invention may also be contained in a masterbatched carrier (i.e., polybutadiene masterbatching using chemically-precise nanoparticles; incorporation of nanoparticulates into a plastic carrier; or incorporation of nanoparticulates into a prepolymer or curative for use in urethane chemistry), encapsulated, or incorporated in re-grind. Below certain nanoparticle diameters, in order to safely utilize the nanoparticulates, they should be preferably held within a matrix too large to affect or pass through human tissue.

The materials for solid cores, which can be blended with the above nanoparticulates, typically include compositions having a base rubber, a crosslinking agent, a filler, and a co-crosslinking or initiator agent. The base rubber typically includes natural or synthetic rubbers. A preferred base rubber is 1,4-polybutadiene having a cis-structure of at least 40%. Most preferably, the base rubber comprises high-Mooney-viscosity rubber but it should be understood that rubbers having Mooney viscosity of any value are acceptable. Preferably, the base rubber has a Mooney viscosity of between about 30 and about 120. If desired, the polybutadiene can also be mixed with other elastomers known in the art such as natural rubber, polyisoprene rubber and/or styrene-butadiene rubber in order to modify the properties of the core.

The crosslinking agent includes a metal salt of an unsaturated fatty or non-fatty acid such as a zinc salt or a magnesium salt of an unsaturated fatty or non-fatty acid having 3 to 8 carbon atoms such as acrylic or methacrylic acid. Suitable cross linking agents include one or more metal salt diacrylates, dimethacrylates and monomethacrylates wherein the metal is magnesium, calcium, zinc, aluminum, sodium, lithium or nickel. Preferred acrylates include zinc acrylate, zinc diacrylate, zinc methacrylate, and zinc dimethacrylate, and mixtures thereof The crosslinking agent is typically present in an amount greater than about 10 phr of the polymer component, preferably from about 10 to 40 phr of the polymer component, more preferably from about 10 to 30 phr of the polymer component.

The initiator agent can be any known polymerization initiator which decomposes during the cure cycle. Suitable initiators include peroxide compounds such as dicumyl peroxide, 1,1-di(t-butylperoxy) 3,3,5-trimethyl cyclohexane, a-a bis (t-butylperoxy) diisopropylbenzene, 2,5-dimethyl-2,5 di(t-butylperoxy) hexane or di-t-butyl peroxide and mixtures thereof.

Density-adjusting fillers typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like.

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The invention also includes a method to convert the cis-isomer of the polybutadiene resilient polymer component to the trans-isomer during a molding cycle and to form a golf ball. A variety of methods and materials have been disclosed in U.S. Pat. Nos. 6,162,135; 6,465,578; 6,291,592; and 6,458,895 which are incorporated herein, in their entirety, by reference.

The golf ball components, preferably centers and/or core layers, of the present invention may also be formed from, or include as a blend, highly-neutralized polymers ("HNP"). The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by organic fatty acids, or both. The second polymer component, which may be partially- or fully-neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment of the present invention the HNP's are ionomers and/or their acid precursors that are preferably neutralized, either filly or partially, with organic acid copolymers or the salts thereof. The acid copolymers are preferably α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth) acrylic acid/n-butyl, acrylate, ethylene/(meth)acrylic acid/ethyl acrylate, and ethylene/(meth) acrylic acid/methyl acrylate copolymers. Other suitable examples are disclosed in U.S. Pat. No. 6,872,774, which is incorporated herein, in its entirety, by reference.

Ionomers are typically neutralized with a metal cation, such as Li, Na, Mg, or Zn. It has been found that by adding sufficient organic acid or salt of organic acid, along with a suitable base, to the acid copolymer or ionomer, however, the ionomer can be neutralized, without losing processability, to a level much greater than for a metal cation. Preferably, the acid moieties are neutralized greater than about 80%, preferably from 90–100%, most preferably 100%, without losing processability. This accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably 100%).

The organic acids of the present invention are aliphatic, mono- or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers may also be partially neutralized with metal cations. The acid moiety in the acid copolymer is neutralized about 1 to about 100%, preferably at least about 40 to about 100%, and more preferably at least about 90 to about 100%, to form an ionomer by a cation such as lithium, sodium, potassium, magnesium, calcium, barium, lead, tin, zinc, aluminum, or a mixture thereof. The acid copolymers are generally prepared from 'direct' acid copolymers, copolymers polymerized by adding all monomers simultaneously, or by grafting of at least one acid-containing monomer onto an existing polymer.

A preferred method for preparing the nanocomposite ethylene copolymer compositions of the invention is by in-situ polymerization. When this preferred method is employed, the golf balls of the invention are typically formed in the following manner. A nanoparticulate material, such as the suitable but non-limiting examples disclosed herein, is selected. A first monomer, including an olefin, is then selected along with a second monomer containing an α,β-ethylenically-unsaturated carboxylic acid. Optionally, an ionic co-monomer may be substituted for (or added in addition to) the α,β-ethylenically-unsaturated carboxylic acid. The first monomer and the second monomer are then in-situ polymerized in the presence of the nanoparticulate and a suitable catalyst to form a first polymer. The first polymer is then post neutralized with a cation source to form a nanocomposite ionomer. The nanocomposite ionomer is then formed into the desired golf ball layer, such as an intermediate layer or a cover layer. It should be recognized that in an alternative embodiment, the step of post neutralization may be omitted such that the polymer formed is a nanocomposite non-ionomer.

In-situ polymerization typically involves first dispersing the nanoparticluates, such as organically-modified monotmorillonite, in a comonomer, such as methacrylic acid monomer, and, optionally, in a third monomer, such as alkyl acrylate or methacrylate, to achieve uniform dispersion of the nanoparticulates. Subsequently, both ethylene and the nanoparticulate comonomer mixture are metered into a high-pressure reactor, in the presence of a suitable catalyst, such as a free radical initiator, metallocene catalyst, or single-site Ziegler-Natta catalyst. The ethylene monomer will copolymerize with methacrylic acid monomer nanoparticulate mixture. This in-situ acid copolymer will typically be post-neutralized using a suitable base and any organic acid (and their salts) to produce a range of neutralized nanocomposite ionomers. The post-neutralization step can be omitted if it is desired to produce an in-situ non-ionomeric polymer nanocomposite.

Preferably, the first monomer includes ethylene or propylene and the second monomer comprises acrylic acid or methacrylic acid. Although not required, the nanoparticulate should be pre-dispersed in the second monomer. The method may, optionally, include the step of providing a third monomer comprising ethylenically-unsaturated alkyl acrylate or ethylenically-unsaturated alkyl methacrylate prior to the in-situ polymerization.

Typically, the cation source includes a first metal salt of an organic acid, inorganic base, or an organic base; and is present in an amount sufficient to neutralize the α,β-ethylenically-unsaturated carboxylic acid by 10% to 90%. In one embodiment, a second organic acid or a metal salt thereof is also included in the blend. Preferably, the cation source is present in an amount sufficient to neutralize the α,β-ethylenically-unsaturated carboxylic acid by 90% to 100%. The polymer may further include a fatty acid or a metal salt thereof.

The fatty acid salt is generally formed from a fatty acid including stearic acid, lauric acid, behenic acid, erucic acid, oleic acid, linoleic acid, pelargonic acid, and dimerized derivatives thereof. Also, the fatty acid salt is typically formed from a metal cation including barium, lithium, sodium, zinc, bismuth, chromium, cobalt, copper, potassium, strontium, titanium, tungsten, magnesium, cesium, iron, nickel, silver, aluminum, tin, and calcium. The cation source may be metal cations of lithium, sodium, potassium, magnesium, calcium, barium, lead, tin, zinc, or aluminum.

A preferred golf ball includes a core, and the nanocomposite ionomer (or non-ionomer) layer, whether an intermediate (outer core or casing type layer), is disposed about the core. The nanoparticulate selected may be swellable layered materials; micaceous minerals; smectite minerals; carbon nanotubes; fullerenes; nanoscale titanium oxides; iron oxides; ceramics; modified ceramics; metal and oxide powders; titanium dioxide particles; single-wall and multi-wall carbon nanotubes; polymer nanofibers; carbon nanofibrils; nitrides; carbides; sulfides; gold nanoparticles; ormocers; glass ionomers; resin-modified glass ionomers; silicon ionomers; polymerizable cements; metal-oxide polymer composites; lipid-based nanotubules, graphite sheets, or polyhedral oligomeric silsequioxanes, to name but a few.

In an alternative embodiment, the cation source may be present in an amount sufficient to neutralize the α,β-ethylenically-unsaturated carboxylic acid by 10% to 100%. To accomplish this highly-neutralized state, the nanocomposite ethylene copolymer typically includes a fatty acid or a metal salt thereof.

If an outer cover layer is disposed about the intermediate layer and is not formed from the nanocomposite materials of the invention, it will generally be formed from polyurethanes, polyureas, polyurea-urethanes, polyurethane-ureas, ionomeric materials, vinyl resins, polyolefins, polyamides, acrylic resins, thermoplastics, polyphenylene oxide resins, thermoplastic polyesters, thermoplastic rubbers, or fully-neutralized ionomers.

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

The elastomeric polyolefins are polymers composed of ethylene and higher primary olefins such as propylene, hexene, octene, and optionally 1,4-hexadiene and or ethylidene norbornene or norbomadiene. The elastomeric polyolefins can be optionally functionalized with maleic anhydride, epoxy, hydroxy, amine, carboxylic acid, sulfonic acid, or thiol groups.

Thermoplastic polyurethanes are linear or slightly chain branched polymers consisting of hard blocks and soft elastomeric blocks. They are produced by reacting soft hydroxy-terminated elastomeric polyethers or polyesters with diisocyanates, such as methylene diisocyanate, p-phenylene diisocyanate, or toluene diisocyanate. These polymers can be chain extended with glycols, secondary diamines, diacids, or amino alcohols. The reaction products of the isocyanates and the alcohols are called urethanes and these blocks are relatively hard and high melting. These hard high melting blocks are responsible for the thermoplastic nature of the polyurethanes.

HNP's may also be blended with high-crystalline acid copolymers and their ionomer derivatives (which may be neutralized with conventional metal cations or the organic fatty acids and salts thereof) or a blend of a high crystalline acid copolymer and its ionomer derivatives and at least one additional material, preferably an acid copolymer and its ionomer derivatives. As used herein, the term "high crystalline acid copolymer" is defined as a "product-by-process" in which an acid copolymer or its ionomer derivatives formed from a ethylene/carboxylic acid copolymer comprising about 5 to about 35 percent by weight acrylic or methacrylic acid, wherein the copolymer is polymerized at a temperature of about 130° C. to 200° C., at pressures greater than about 20,000 psi preferably greater than about 25,000 psi, more pref. from about 25,000 psi to about 50,000 psi, wherein up to about 70 percent, preferably 100 percent, of the acid groups are neutralized with a metal ion, organic fatty acids and salts thereof, or a mixture thereof. The copolymer can have a melt index of from about 20 to about 300 g/10 min, preferably about 20 to about 200 g/10 min, and upon neutralization of the copolymer, the resulting acid copolymer and its ionomer derivatives should have a melt index of from about 0.1 to about 30.0 g/10 min. Suitable high-crystalline acid copolymers and their ionomer derivatives, and methods for making them are disclosed in U.S. Pat. No. 5,580,927, the disclosure of which is hereby incorporated by reference in its entirety.

HNP's may also be blended with cationic ionomers, such as those disclosed in U.S. Pat. No. 6,193,619, which is incorporated herein, in its entirety, by reference. HNP's may also be blended with polyurethane and polyurea ionomers which include anionic moieties or groups, such as those disclosed in U.S. Pat. No. 6,207,784, which is incorporated herein, in its entirety, by reference. Typically, such groups are incorporated onto the diisocyanate or diisocyanate component of the polyurethane or polyurea ionomers. The anionic group can also be attached to the polyol or amine component of the polyurethane or polyurea, respectively. Preferably, the anionic group is based on a sulfonic, carboxylic or phosphoric acid group. Also, more than one type of anionic group can be incorporated into the polyurethane or polyurea.

Thermoplastic resins and rubbers for use as the matrix polymer and/or as an intercalant polymer, in the practice of this invention may vary widely. Illustrative of useful thermoplastic resins, which may be used alone or in admixture, include, but are not limited to, polylactones such as poly(pivalolactone), poly(caprolactone) and the like; polyurethanes derived from reaction of diisocyanates such as 1,5-naphthalene diisocyanate;p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane, and the like.

Also suitable are linear long-chain diols such as poly(tetramethylene adipate), poly(ethylene adipate), poly(1,4-butylene adipate), poly(ethylene succinate), poly(2,3-butylene succinate), polyether diols and the like; polycarbonates such as poly [methane bis(4-phenyl)carbonate], poly [1,1-ether bis(4-phenyl)carbonate], poly [diphenylmethane bis(4-phenyl)carbonate], poly [1,1-cyclohexane bis(4-phenyl)carbonate] and the like; polysulfones; polyethers; polyketones; polyamides such as poly(4-amino butyric acid), poly(hexamethylene adipamide), poly(6-aminohexanoic acid), poly(m-xylylene adipamide), poly(p-xylylene sebacamide), poly(2,2,2-trimethyl hexamethylene terephthalamide), poly(m-phenylene isophthalamide) (NOMEX®), poly(p-phenylene terephthalamide) (KEVLAR®), and the like; polyesters such as poly(ethylene azelate), poly(ethylene-1,5-naphthalate, poly(1,4-cyclohexane dimethylene terephthalate), poly(ethylene oxybenzoate) (A-TELL®), poly(p-hydroxy benzoate) (EKONOL®), poly(1,4-cyclohexylidene dimethylene terephthalate) (KODEL®), poly(1,4-cyclohexylidene dimethylene terephthalate) (KODEL®), polyethylene terephthalate, polybutylene terephthalate, polytrimethylene terepthalate ("PTT"), and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide), and the like.

Further suitable polymers include, but are not limited to polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers, and the like; polyolefins such as low density poly(ethylene), poly(propylene), chlorinated low density poly(ethylene), poly(4-methyl-1-pentene), poly(ethylene), poly(styrene), and the like; ionomers; poly(epichlorohydrins); and polysulfones, such as the reaction product of the sodium salt of 2,2-bis(4-hydroxyphenyl)propane and 4,4'-dichlorodiphenyl sulfone; furan resins, such as poly(furan); cellulose ester plastics, such as cellulose acetate, cellulose acetate butyrate, cellulose propionate, and the like; silicones such as poly(dimethyl siloxane), poly(dimethyl siloxane), poly(dimethyl siloxane co-phenylmethyl siloxane), and the like; protein plastics; and blends of two or more of the foregoing.

Preferably, the nanomaterials can be blended with materials such as ionomers, copolyether-ester, copolyester-ester, copolyether-amide, copolyester-amide, thermoplastic urethanes, metallocene or single-site non-metallocene catalyzed polymers, polyamides, liquid crystal polymers, as well as other polymers mentioned in U.S. Pat. Nos. 6,124,389; 6,025,442; and 6,001,930, the disclosures of which are incorporated herein, in their entirety, by reference thereto.

Vulcanizable and thermoplastic rubbers useful as the matrix polymer and/or as a water insoluble intercalant polymer, in the practice of this invention may also vary widely. Examples include but are not limited to, brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly(isoprene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers made up of segments of glassy or crystalline blocks such as poly(styrene), poly(vinyltoluene), poly(t-butyl styrene), polyesters and the like and the elastomeric blocks such as poly(butadiene), poly(isoprene), ethylene-propylene copolymers, ethylene-butylene copolymers, polyether and the like as for example the copolymers in poly(styrene)-poly(butadiene)-poly(styrene) block copolymer manufactured by Shell Chemical Company of Houston, Tex., under the tradename KRATON®.

Useful thermosetting resins include, but are not limited to, polyamides; polyalkylamides; polyesters; polyurethanes; polycarbonates; polyepoxides; and mixtures thereof. Thermoset resins based on water-soluble prepolymers, include prepolymers based on formaldehyde: phenols (phenol, cresol and the like); urea; melamine; melamine and phenol; urea and phenol. Polyurethanes based on: toluene diisocyanate and monomeric and polymeric diphenyl methanediisocyanates; p-phenylenediisocynate; hydroxy terminated polyethers (polyethylene glycol, polypropylene glycol, copolymers of ethylene oxide and propylene oxide and the like); amino terminated polyethers; polyamines (tetramethylene diamine, ethylenediamine, hexamethylenediamine, 2,2-dimethyl 1,3-propanediamine; melamine, diaminobenzene, triaminobenzene and the like); polyamidoamines (i.e., hydroxy terminated polyesters); unsaturated polyesters based on maleic and fumaric anhydrides and acids; glycols (i.e.,ethylene, propylene); polyethylene glycols; polypropylene glycols; aromatic glycols and polyglycols; unsaturated polyesters based on vinyl, allyl and acryl monomers; epoxides, based on biphenol A (2,2'-bis(4-hydroxyphenyl) propane) and epichlorohydrin; epoxy prepolymers based on monoepoxy and polyepoxy compounds and α,β-unsaturated compounds (styrene, vinyl, allyl, acrylic monomers); polyamides (i.e., 4-tetramethylene diamine; hexamethylene diamine; melamine; 1,3-propanediamine; diaminobenzene; triaminobenzene; 3,3',4,4'-bitriaminobenzene; 3,3',4,4'-biphenyltetramine; and the like). U.S. Pat. No. 6,818,705, which discloses other suitable compositions, is incorporated herein, in its entirety, by reference.

Also suitable are polyethyleneimines; amides and polyamides (amides of di-, tri-, and tetra acids); hydroxyphenols (pyrogallol, gallic acid, tetrahydroxybenzophenone, tetrahydroquinone, catechol, phenol and the like); anhydrides and polyandrides of di-, tri-, and tetraacids; polyisocyanurates based on TDI and MDI; polyimides based on pyromellitic dianhydride and 1,4-phenyldiamine; polybenzimidozoles based on 3 3',4 4'-biphenyltetramine and isophthalic acid; polyamide based on unsaturated dibasic acids and anhydrides (maleic, fumaric) and aromatic polyamides; alkyd resins based on dibasic aromatic acids or anhydrides, glycerol, trimethylolpropane, pentaerythritol, sorbitol and unsaturated fatty long chain carboxylic acids (the latter derived from vegetable oils); and prepolymers based on acrylic monomers (hydroxy or carboxy functional).

In addition, the nanoparticulates can be incorporated in the polyurethane, polyurea and epoxy and their ionomeric derivatives and IPN polymers that are known in the golf ball compositions. This can be achieved by various processes like casting, reaction injection molding and other process that are well known in the art. Further, the nanomaterials can also be used in ink and paint formulations to improve its mechanical properties and abrasion resistant. The nanomaterials can be present any where between about 0.5 and about 20 weight percent in the compositions of the present invention.

In a preferred embodiment of the present invention, the polymer composition, typically a polybutadiene rubber based rubber composition, comprises nanoparticulate zinc oxide, which has an average particle diameter of less than 100 mm. Conventional ZnO ranges in size from about 1 μm to about 50 μm. Without wishing to be bound by any particular theory it is believed that the smaller particle size of the nanoparticulate ZnO, which has a much larger active surface area than does convention ZnO, allows the ZnO nanoparticles to "participate" more intricately in the formation and development of the polybutadiene properties. An example of nanoparticulate ZnO includes NANOX®, which is commercially available from Elementis of Ghent, Belgium. Other non-reacting, high-specific nanoparticulates that are suitable for the blends of the present invention include tungsten, tungsten trioxide, tungsten carbide, bismuth trioxide, tin oxide, nickel, aluminum oxide, iron oxide, and mixtures thereof.

The cover provides the interface between the ball and a club. Properties that are desirable for the cover include good moldability, high abrasion resistance, high tear strength, high resilience, and good mold release. The cover typically has a thickness to provide sufficient strength, good performance characteristics, and durability. The cover preferably has a thickness of less than about 0.1 inches, preferably, less than about 0.05 inches, more preferably, between about 0.02 inches and about 0.04 inches, and most preferably, between about 0.025 and about 0.035 inches. The invention is particularly directed towards a multilayer golf ball which comprises a core, an inner cover layer, and an outer cover layer. In this embodiment, preferably, at least one of the inner and outer cover layer has a thickness of less than about 0.05 inches, more preferably between about 0.02 inches and about 0.04 inches. Most preferably, the thickness of either layer is about 0.03 inches.

When the golf ball of the present invention includes an intermediate layer, such as an outer core layer or an inner cover layer, any or all of these layer(s) may comprise thermoplastic and thermosetting material, but preferably the intermediate layer(s), if present, comprise any suitable material, such as ionic copolymers of ethylene and an unsaturated monocarboxylic acid which are available under the trademark SURLYN® of E. I. DuPont de Nemours & Co., of Wilmington, Del., or IOTEK® or ESCOR® of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

The golf balls of the present invention can likewise include one or more homopolymeric or copolymeric inner or outer cover materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates, in particular PPDI-based thermoplastic polyurethanes, and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethylene-propylene-non-conjugated diene terpolymer, and the like;

(6) Acrylic resins and blends of these resins with poly vinyl chloride, elastomers, and the like;

(7) Thermoplastics, such as urethane; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;

(8) Polyphenylene oxide resins or blends of polyphenylene oxide with high impact polystyrene as sold under the trademark NORYL® by General Electric Company of Pittsfield, Mass.;

(9) Thermoplastic polyesters, such as polyethylene terephthalate, polybutylene terephthalate, polyethylene terephthalate/glycol modified, poly(trimethylene terepthalate), and elastomers sold under the trademarks HYTREL® by E.I. DuPont de Nemours & Co. of Wilmington, Del., and LOMOD® by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Preferably, the inner and/or outer covers include polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(vinyl alcohol), poly(tetrafluoroethylene) and their copolymers including functional comonomers, and blends thereof. Suitable layer compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 16 to 35 weight percent, making the ionomer a high modulus ionomer. In a higher spin embodiment, the inner cover layer includes an ionomer where an acid is present in about 10 to 15 weight percent and includes a softening comonomer. Additionally, high-density polyethylene, low-density polyethylene, LLDPE, and homo- and co-polymers of polyolefin are suitable for a variety of golf ball layers.

In a preferred embodiment of the present invention, saturated polyurethanes and/or polyureas are used to form cover layers, preferably the outer cover layer, and may be selected from among both castable thermoset and thermoplastic polyurethanes and/or polyureas.

Thermoplastic materials may be blended with other thermoplastic materials, but thermosetting materials are difficult if not impossible to blend homogeneously after the thermosetting materials are formed. Preferably, the saturated polyurethane comprises from about 1% to about 100%, more preferably from about 10% to about 75% of the cover composition and/or the intermediate layer composition. About 90% to about 10%, more preferably from about 90% to about 25% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates, and polyacrylates. Unless otherwise stated herein, all percentages are given in percent by weight of the total composition of the golf ball layer in question.

Polyurethane prepolymers are produced by combining at least one polyol, such as a polyether, polycaprolactone, polycarbonate or a polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance.

Thermoplastic polyurethanes may be blended with suitable materials to produce a thermoplastic end product. Examples of such additional materials may include ionomers such as the SURLYN®, ESCOR® and IOTEK® copolymers described above.

Other suitable materials which may be combined with the saturated polyurethanes in forming the cover and/or intermediate layer(s) of the golf balls of the invention include ionic or non-ionic polyurethanes and polyureas, epoxy resins, polyethylenes, polyamides and polyesters. For example, the cover and/or intermediate layer may be formed from a blend of at least one saturated polyurethane and thermoplastic or thermoset ionic and non-ionic urethanes and polyurethanes, cationic urethane ionomers and urethane epoxies, ionic and non-ionic polyureas and blends thereof. Examples of suitable urethane ionomers, polyurethanes, and polyureas are disclosed in U.S. Pat. Nos. 5,692,974; 5,334,673; 5,484,870; and 5,908,358, the disclosures of which are incorporated herein, in their entirety, by reference.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety.

The outer cover is preferably formed around the inner cover by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. Nos. 5,006,297 and 5,334,673 both also disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

Depending on the desired properties, balls prepared according to the invention can exhibit substantially the same or higher resilience, or coefficient of restitution ("COR"), with a decrease in compression or modulus, compared to balls of conventional construction. Additionally, balls prepared according to the invention can also exhibit substantially higher resilience, or COR, without an increase in compression, compared to balls of conventional construction. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The molding process and composition of golf ball portions typically results in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C.

U.S. Patent Application Publication Nos. 2003/0114565 and 2003/0050373, which are incorporated by reference herein in their entirety, discuss soft, high resilient ionomers, which are preferably from neutralizing the acid copolymer(s) of at least one E/X/Y copolymer, where E is ethylene, X is the α,β-ethylenically unsaturated carboxylic acid, and Y is a softening co-monomer. X is preferably present in 2–30 (preferably 4–20, most preferably 5–15) wt. % of the polymer, and Y is preferably present in 17–40 (preferably 20–40, and more preferably 24–35) wt. % of the polymer. Preferably, the melt index (MI) of the base resin is at least 20, or at least 40, more preferably, at least 75 and most preferably at least 150. Particular soft, resilient ionomers included in this invention are partially neutralized ethylene/(meth) acrylic acid/butyl (meth) acrylate copolymers having an MI and level of neutralization that results in a melt processible polymer that has useful physical properties. The copolymers are at least partially neutralized. Preferably at least 40, or, more preferably at least 55, even more preferably about 70, and most preferably about 80 of the acid moiety of the acid copolymer is neutralized by one or more alkali metal, transition metal, or alkaline earth metal cations. Cations useful in making the ionomers of this invention comprise lithium, sodium, potassium, magnesium, calcium, barium, or zinc, or a combination of such cations.

The invention also relates to a "modified" soft, resilient thermoplastic ionomer that comprises a melt blend of (a) the acid copolymers or the melt processiible ionomers made therefrom as described above and (b) one or more organic acid(s) or salt(s) thereof, wherein greater than 80%, preferably greater than 90% of all the acid of (a) and of (b) is neutralized. Preferably, 100% of all the acid of (a) and (b) is neutralized by a cation source. Preferably, an amount of cation source in excess of the amount required to neutralize 100% of the acid in (a) and (b) is used to neutralize the acid in (a) and (b). Blends with fatty acids or fatty acid salts are preferred.

The organic acids or salts thereof are added in an amount sufficient to enhance the resilience of the copolymer. Preferably, the organic acids or salts thereof are added in an amount sufficient to substantially remove remaining ethylene crystallinity of the copolymer.

Preferably, the organic acids or salts are added in an amount of at least about 5% (weight basis) of the total amount of copolymer and organic acid(s). More preferably, the organic acids or salts thereof are added in an amount of at least about 15%, even more preferably at least about 20%. Preferably, the organic acid(s) are added in an amount up to about 50% (weight basis) based on the total amount of copolymer and organic acid. More preferably, the organic acids or salts thereof are added in an amount of up to about 40%, more preferably, up to about 35%. The non-volatile, non-migratory organic acids preferably are one or more aliphatic, mono-functional organic acids or salts thereof as described below, particularly one or more aliphatic, mono-functional, saturated or unsaturated organic acids having less than 36 carbon atoms or salts of the organic acids, preferably stearic acid or oleic acid. Fatty acids or fatty acid salts are most preferred.

Processes for fatty acid (salt) modifications are known in the art. Particularly, the modified highly-neutralized soft, resilient acid copolymer ionomers of this invention can be produced by:

(a) melt-blending (1) ethylene, α,β-ethylenically unsaturated $C_{3-8}$ carboxylic acid copolymer(s) or melt-processible ionomer(s) thereof that have their crystallinity disrupted by addition of a softening monomer or other means with (2) sufficient non-volatile, non-migratory organic acids to substantially enhance the resilience and to disrupt (preferably remove) the remaining ethylene crystallinity, and then concurrently or subsequently (b) adding a sufficient amount of a cation source to increase the level of neutralization of all the acid moieties (including those in the acid copolymer and in the organic acid if the non-volatile, non-migratory organic acid is an organic acid) to the desired level.

The weight ratio of X to Y in the composition is at least about 1:20. Preferably, the weight ratio of X to Y is at least about 1:15, more preferably, at least about 1:10. Furthermore, the weight ratio of X to Y is up to about 1:1.67, more preferably up to about 1:2. Most preferably, the weight ratio of X to Y in the composition is up to about 1:2.2.

The acid copolymers used in the present invention to make the ionomers are preferably 'direct' acid copolymers (containing high levels of softening monomers). As noted above, the copolymers are at least partially neutralized, preferably at least about 40% of X in the composition is neutralized. More preferably, at least about 55% of X is neutralized. Even more preferably, at least about 70, and most preferably, at least about 80% of X is neutralized. In the event that the copolymer is highly neutralized (e.g., to at least 45%, preferably 50%, 55%, 70%, or 80%, of acid moiety), the MI of the acid copolymer should be sufficiently high so that the resulting neutralized resin has a measurable MI in accord with ASTM D-1238, condition E, at 190° C., using a 2160 gram weight. Preferably this resulting MI will be at least 0.1, preferably at least 0.5, and more preferably 1.0 or greater. Preferably, for highly neutralized acid copolymer, the MI of the acid copolymer base resin is at least 20, or at least 40, at least 75, and more preferably at least 150.

The acid copolymers preferably comprise alpha olefin, particularly ethylene, $C_{3-8}$. α,β-ethylenically unsaturated carboxylic acid, particularly acrylic and methacrylic acid, and softening monomers, selected from alkyl acrylate, and alkyl methacrylate, wherein the alkyl groups have from 1–8 carbon atoms, copolymers. By "softening," it is meant that the crystallinity is disrupted (the polymer is made less crystalline). While the alpha olefin can be a $C_2$–$C_4$ alpha olefin, ethylene is most preferred for use in the present invention. Accordingly, it is described and illustrated herein in terms of ethylene as the alpha olefin.

The acid copolymers, when the alpha olefin is ethylene, can be described as E/X/Y copolymers where E is ethylene, X is the α,β-ethylenically unsaturated carboxylic acid, and Y is a softening comonomer; X is preferably present in 2–30 (preferably 4–20, most preferably 5–15) wt. % of the polymer, and Y is preferably present in 17–40 (preferably 20–40, most preferably 24–35) wt. % of the polymer.

Specific acid-copolymers include ethylene/(meth) acrylic acid/n-butyl (meth) acrylate, ethylene/(meth) acrylic acid/iso-butyl (meth) acrylate, ethylene/(meth) acrylic acid/methyl (meth) acrylate, and ethylene/(meth) acrylic acid/ethyl (meth) acrylate terpolymers.

The organic acids employed are aliphatic, mono-functional (saturated, unsaturated, or multi-unsaturated) organic acids, particularly those having fewer than 36 carbon atoms. Also salts of these organic acids may be employed. Fatty acids or fatty acid salts are preferred. The salts may be any of a wide variety, particularly including the barium, lithium, sodium, zinc, bismuth, potassium, strontium, magnesium or calcium salts of the organic acids. Particular organic acids useful in the present invention include caproic acid, caprylic acid, capric acid, lauric acid, stearic acid, behenic acid, erucic acid, oleic acid, and linoleic acid.

The optional filler component is chosen to impart additional density to blends of the previously described components, the selection being dependent upon the different parts (e.g., cover, mantle, core, center, intermediate layers in a multilayered core or ball) and the type of golf ball desired (e.g., one-piece, two-piece, three-piece or multiple-piece ball), as will be more fully detailed below.

Generally, the filler will be inorganic having a density greater than about 4 g/cm³, preferably greater than 5 g/cm³, and will be present in amounts between 0 to about 60 wt. % based on the total weight of the composition. Examples of useful fillers include zinc oxide, barium sulfate, lead silicate and tungsten carbide, as well as the other well-known fillers used in golf balls. It is preferred that the filler materials be non-reactive or almost non-reactive and not stiffen or raise the compression nor reduce the coefficient of restitution significantly.

Additional optional additives useful in the practice of the subject invention include acid copolymer wax (e.g., Allied wax AC 143 believed to be an ethylene/16–18% acrylic acid copolymer with a number average molecular weight of 2,040), which assist in preventing reaction between the filler materials (e.g., ZnO) and the acid moiety in the ethylene copolymer. Other optional additives include $TiO_2$, which is used as a whitening agent; optical brighteners; surfactants; processing aids; etc.

Ionomers may be blended with conventional ionomeric copolymers (di-, ter-, etc.), using well-known techniques, to manipulate product properties as desired. The blends would still exhibit lower hardness and higher resilience when compared with blends based on conventional ionomers.

Also, ionomers can be blended with non-ionic thermoplastic resins to manipulate product properties. The non-ionic thermoplastic resins would, by way of non-limiting illustrative examples, include thermoplastic elastomers, such as polyurethane, poly-ether-ester, poly-amide-ether, polyether-urea, PEBAX® (a family of block copolymers based on polyether-block-amide, commercially supplied by Atochem), styrene-butadiene-styrene (SBS) block copolymers, styrene(ethylene-butylene)-styrene block copolymers, etc., poly amide (oligomeric and polymeric), polyesters, polyolefins including PE, PP, E/P copolymers, etc., ethylene copolymers with various comonomers, such as vinyl acetate, (meth)acrylates, (meth)acrylic acid, epoxy-functionalized monomer, CO, etc., functionalized polymers with maleic anhydride grafting, epoxidization etc., elastomers, such as EPDM, metallocene catalyzed PE and copolymer, ground up powders of the thermoset elastomers, etc. Such thermoplastic blends comprise about 1% to about 99% by weight of a first thermoplastic and about 99% to about 1% by weight of a second thermoplastic.

In one embodiment, the formation of a golf ball starts with forming the inner core. The inner core, outer core, and the cover are formed by compression molding, by injection molding, or by casting. These methods of forming cores and covers of this type are well known in the art. The materials used for the inner and outer core, as well as the cover, are selected so that the desired playing characteristics of the ball are achieved. The inner and outer core materials have substantially different material properties so that there is a predetermined relationship between the inner and outer core materials, to achieve the desired playing characteristics of the ball.

In one embodiment, the inner core is formed of a first material having a first Shore D hardness, a first elastic modulus, a first specific gravity, and a first Bashore resilience. The outer core is formed of a second material having a second Shore D hardness, a second elastic modulus, a second specific gravity, and a second Bashore resilience. Preferably, the material property of the first material equals at least one selected from the group consisting of the first Shore D hardness differing from the second Shore D hardness by at least 10 points, the first elastic modulus differing from the second elastic modulus by at least 10%, the first specific gravity differing from the second specific gravity by at least 0.1, or a first Bashore resilience differing from the second Bashore resilience by at least 10%. It is more preferred that the first material have all of these material property relationships.

Moreover, it is preferred that the first material has the first Shore D hardness between about 30 and about 80, the first elastic modulus between about 5,000 psi and about 100,000 psi, the first specific gravity between about 0.8 and about 1.6, and the first Bashore resilience greater than 30%.

In another embodiment, the first Shore D hardness is less than the second Shore D hardness, the first elastic modulus is less than the second elastic modulus, the first specific gravity is less than the second specific gravity, and the first Bashore resilience is less than the second Bashore resilience. In another embodiment, the first material properties are greater than the second material properties. The relationship between the first and second material properties depends on the desired playability characteristics.

Suitable inner and outer core materials include HNP's neutralized with organic fatty acids and salts thereof, metal cations, or a combination of both, thermosets, such as rubber, polybutadiene, polyisoprene; thermoplastics, such as ionomer resins, polyamides or polyesters; or thermoplastic elastomers. Suitable thermoplastic elastomers include PEBAX®, HYTREL®, thermoplastic urethane, and KRATON®, which are commercially available from Elf-Atochem, DuPont, BF Goodrich, and Shell, respectively. The inner and outer core materials can also be formed from a castable material. Suitable castable materials include, but are not limited to, urethane, urea, epoxy, diols, or curatives.

The cover is selected from conventional materials used as golf ball covers based on the desired performance characteristics. The cover may be comprised of one or more layers. Cover materials such as ionomer resins, blends of ionomer resins, thermoplastic or thermoset urethanes, and balata, can be used as known in the art and discussed above. In other embodiments, additional layers may be added to those mentioned above or the existing layers may be formed by multiple materials.

The resultant golf balls typically have a coefficient of restitution of greater than about 0.7, preferably greater than about 0.75, and more preferably greater than about 0.78. The golf balls also typically have an Atti compression of at least about 40, preferably from about 50 to 120, and more preferably from about 60 to 100. The golf ball cured polybutadiene material typically has a hardness of at least about 15 Shore A, preferably between about 30 Shore A and 80 Shore D, more preferably between about 50 Shore A and 60 Shore D.

Additionally, the unvulcanized rubber, such as polybutadiene, in golf balls prepared according to the invention typically has a Mooney viscosity of between about 40 and about 80, more preferably, between about 45 and about 65, and most preferably, between about 45 and about 55. Mooney viscosity is typically measured according to ASTM-D1646.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 500 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-D2240, less than about 45 Shore D, preferably less than about 40 Shore D, more preferably between about 25 and about 40 Shore D, and most preferably between about 30 and about 40 Shore D. The casing preferably has a material hardness of less than about 70 Shore D, more preferably between about 30 and about 70 Shore D, and most preferably, between about 50 and about 65 Shore D.

In a preferred embodiment, the intermediate layer material hardness is between about 40 and about 70 Shore D and the outer cover layer material hardness is less than about 40 Shore D. In a more preferred embodiment, a ratio of the intermediate layer material hardness to the outer cover layer material hardness is greater than 1.5.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

In one embodiment, the core of the present invention has an Atti compression of between about 50 and about 90, more preferably, between about 60 and about 85, and most preferably, between about 65 and about 85. The overall outer diameter ("OD") of the core is less than about 1.590 inches, preferably, no greater than 1.580 inches, more preferably between about 1.540 inches and about 1.580 inches, and most preferably between about 1.525 inches to about 1.570 inches. The OD of the casing of the golf balls of the present invention is preferably between 1.580 inches and about 1.640 inches, more preferably between about 1.590 inches to about 1.630 inches, and most preferably between about 1.600 inches to about 1.630 inches.

The present multilayer golf ball can have an overall diameter of any size. Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The polymers of the present invention may also be used in golf equipment, in particular, inserts for golf clubs, such as putters, irons, and woods, and in golf shoes and components thereof.

Other than in the operating examples, or unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method for making a golf ball comprising the steps of:
    providing a core;
    providing a nanoparticulate;
    providing a first monomer comprising an olefin;
    providing a second monomer comprising an $\alpha,\beta$-ethylenically unsaturated carboxylic acid;
    in-situ polymerizing the first monomer and the second monomer in the presence of the nanoparticulate to form a nanocomposite non-ionic co-polymer, the nanoparticulate consisting essentially of carbon nanotubes; fullerenes; single-wall and multi-wall carbon nanotubes; carbon nanofibrils; glass ionomers; resin-modified glass ionomers; silicon ionomers; lipid-based nanotubules, graphite sheets, or polyhedral oligomeric silsequioxanes;
    forming an inner cover layer about the core from the nanocomposite non-ionic polymer; and
    forming an outer cover layer over the inner cover layer, the outer cover comprising a castable urethane or urea material.

2. The method of claim 1, wherein the first monomer comprises ethylene or propylene.

3. The method of claim 1, wherein the second monomer comprises acrylic acid or methacrylic acid.

4. The method of claim 1, wherein the nanoparticulate is pre-dispersed in the second monomer.

5. The method of claim 1, wherein the nanoparticulate is present in an amount of 0.1 weight % to 10 weight percent of the nanocomposite non-ionomer.

6. The method of claim 1, wherein the cover has a material hardness of 20 Shore D to 70 Shore D.

7. The method of claim 1, wherein the cover has a flexural modulus of 5,000 psi to 80,000 psi.

8. The method of claim 1, wherein the core has a surface hardness of 20 Shore D to 60 Shore D.

9. The method of claim 1, wherein the core has an elastic modulus of 1,000 psi to 15,000 psi.

10. The method of claim 1, wherein the cover further comprises a density-adjusting filler.

11. The method of claim 1, wherein the core is solid, fluid-filled, or hollow.

* * * * *